United States Patent
Howald

(10) Patent No.: US 7,684,341 B2
(45) Date of Patent: Mar. 23, 2010

(54) ENHANCED RETURN PATH PERFORMANCE USING MODULATION-BASED ALIGNMENT CRITERIA

(75) Inventor: Robert Landis Howald, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 2452 days.

(21) Appl. No.: 10/139,802

(22) Filed: May 6, 2002

(65) Prior Publication Data

US 2003/0028898 A1 Feb. 6, 2003

Related U.S. Application Data

(60) Provisional application No. 60/288,754, filed on May 4, 2001.

(51) Int. Cl.
H04N 7/14 (2006.01)
(52) U.S. Cl. .................. 370/252; 370/465; 725/124
(58) Field of Classification Search .............. 370/252, 370/464, 465, 485, 486, 201
See application file for complete search history.

(56) References Cited

U.S. PATENT DOCUMENTS

| | | | | |
|---|---|---|---|---|
| 5,606,725 | A | 2/1997 | Hart | 455/5.1 |
| 6,304,347 | B1 | 10/2001 | Beine et al. | 359/110 |
| 6,323,793 | B1 | 11/2001 | Howald et al. | 341/137 |
| 6,453,472 | B1 | 9/2002 | Leano et al. | 725/111 |
| 6,549,520 | B1 * | 4/2003 | Gross et al. | 370/242 |
| 2001/0055332 | A1 * | 12/2001 | Sadjadpour et al. | 375/222 |
| 2002/0114269 | A1 * | 8/2002 | Onggosanusi et al. | 370/208 |

OTHER PUBLICATIONS

Iler, David, "EAS Compliance: Techniques for Coaxing the Best Possible Performance From the Return Path," Communications Engineering & Design. Apr. 2001 edition. www.cedmagazine.com.
NCTA Recommended Practices for Measurements on Cable Television Systems, 2nd ed., revised 1993, Suppplement on Upstream Transport Issues, Oct. 1997.

* cited by examiner

Primary Examiner—Min Jung
(74) Attorney, Agent, or Firm—Larry T. Cullen

(57) ABSTRACT

A method of allocating power among a plurality of signals, at least two of the signals employing different signal formats, located on different channels of the return path of a cable data network, divides a total power available for the signals on the return path in accordance with a minimum value of an average BER for all the signals and allocates power to each of the signals in accordance therewith. Specifically, a number of parameters are obtained including modulation type and symbol rate for each signal format employed on the return path, the AWGN noise floor across the reverse link, the nominal maximum available RF power for transmitting signals on the reverse path. A predetermined BER expression for each of the modulation types employed on the return path is then obtained, each of the expressions requiring a plurality of input values that includes the above-noted parameters. An expression is then formulated for an average BER based on the predetermined BER expressions and on a number of channels of each signal format type associated with a corresponding BER expression. The power to be allocated to each signal format by minimizing the average BER is then calculated.

20 Claims, 2 Drawing Sheets

ENHANCED RETURN PATH PERFORMANCE USING MODULATION-BASED ALIGNMENT CRITERIA

STATEMENT OF RELATED APPLICATION

This application claims the benefit of priority to U.S. Provisional Patent Application No. 60/288,754, filed May 4, 2001 and entitled "Enhanced Return Path Performance Using Modulation-Based Alignment Criteria."

FIELD OF THE INVENTION

The present invention relates generally to a method of aligning signal types for a return path cable system, and, more particularly, to a method of allocating power among return path channels using a modulation-based alignment criteria.

BACKGROUND OF THE INVENTION

The distribution of return path digital signal levels in cable television (CATV) systems such as a hybrid fiber/coax (HFC) network has typically followed a default standard based on a power-per-Hertz methodology, which simplifies complex issues associated with different services and requirements. The default standard is also easily understood, readily implemented, and effective for most of today's needs. The reason it works is the inherently high signal-to-noise ratio (SNR) of the hybrid fiber coax (HFC) channel obtained with typical approaches for implementing the return path—both analog and digital returns. Even for the worst-case design environment, represented by a completely full return band, the SNR achieved supports the requirements of a typical set of today's services.

More specifically, in this conventional approach the power is allotted to a digital channel is proportional to the bandwidth allotted to that channel. The technique is based on the fact that a fixed amount of available power, driven by the need to operate below the clipping threshold of the return path laser transmitter or analog-to-digital converter (A/D), must be shared by all users. For example, if we assume a 20 dBmV composite drive at the laser input in the node, the power density for a 5-35 MHz return would be:

Per-Hz power density=
20 dBmV−10 Log($35 \times 10^6$)=−55 dBmV/Hz.

Or, in MHz,

Per-Hz power density=
20 dBmV−10 Log(35)=5 dBmV/MHz.

Then, a channel using the highest DOCSIS rate of 2560 ksps, which would have a 30 dB bandwidth of about 3.2 MHz (25% excess BW, or alpha=0.25), would be allotted:

5 dBmV/Hz+10 Log(3.2) dB-MHz=10 dBmV

This simple calculation is applied to each channel in the reverse path multiplex.

A variable in this setup—aside from the fact that different manufacturers have different input levels to their return laser transmitters—is the amount of headroom that should be preserved below the clipping levels for a fully loaded return band. This is an issue to be determined on both a practical basis (how much do plant characteristics change, how much power should be attributed comfortably for large interferers), as well as a philosophical one. On the philosophical side, decisions must be made regarding the inclusion of forward error correction (FEC) gain in performance margin budgets and with respect to traffic considerations, such as the viewpoint on percent simultaneous usage and guaranteed access.

FIG. 1 shows a power-per-Hz reverse path loading channel line up. The advantages are obvious—the spectrum is not very complex to observe, create, or check for proper alignment. Signal-to-Noise ratio (SNR) is constant across the band, and headroom is inherently available as services are added (i.e. new return channels are activated). The example above can also be used to point out one of the most obvious shortcomings of this approach. The power allotted to the example channel is 10 dBmV. However, being a DOCSIS channel, it could be either a 2560 ksps QPSK channel, or a 2560 ksps 16-QAM channel. These two modulations are about 7 dB different in performance versus SNR for a given bit error rate (BER). Clearly, then, this technique does not optimally align levels. In fact, an even less bandwidth efficient and more robust modulation, such as BPSK or binary FSK, would be granted the same power allotment. These schemes have virtually the same SNR requirement as QPSK, but deliver less throughput for a given bandwidth.

Once again, the reason that the conventional power-per-Hz approach has been effective is because it takes advantage of the fact that the reverse path, as it was designed, provides substantially higher SNR than is required for the types of signals it is currently being asked to transport. It has built-in margin based simply on the quality SNR it can deliver relative to the needs of these basic digital communication signals, and the power-per-Hz takes advantage of this margin to non-optimally set carrier levels that still can maintain adequate performance, in exchange for simplicity of implementation.

However, technology advances and progress in communication systems design will create more opportunities for the cable return path. For example, an increase in traffic and usage of the available spectrum, an increase in spectrum desired to transport, higher levels of modulation sophistication, the desire for higher throughput from the same spectrum, and the desire to achieve throughput closer to theoretical channel capacity, are all practical situations under consideration and in development stages in some cases.

For example, cable modem deployment is in the midst of a major expansion that will more fully utilize the return path. This expansion will employ various standards that have been proposed to allow transparent bi-directional transfer of Internet Protocol (IP) traffic between the cable system Headend and customer locations over the CATV network. Data traffic via DOCSIS compliant modems, as well as DOCSIS-based VoIP are driving the push for reliable, high-performance, bi-directional systems. Streaming applications such as file sharing applications for music and video will drive guaranteed bandwidth needs, as well as alter the time-domain dynamics of return path traffic.

For coax-to-the-home plants, the preferred choice of reverse path signaling is some form of digitally modulated RF carrier, constrained to the bandwidth split between forward and return particular to that system. Because return traffic existed before the DOCSIS specification, and because the return bandwidth can be used for applications that generate other revenue when the DOCSIS demand for channels is satisfied, the spectrum is a composite of different signal types, data rates, and modulation formats, and will likely continue to be.

Higher performance analog lasers, new digital technologies, and increased return bandwidth splits are some example of technological developments aimed towards the same goal of enhancing the return path's capabilities. In addition to new technologies, it is prudent to consider other procedures that can enhance return path performance. With increasingly sophisticated signaling, in some cases augmented by more bandwidth, it is useful to consider a power allocation method that can improve performance. In order to close the gap between the maximum potential capacity of the return path and its actual capacity as currently implemented, a more optimal way to align the varying signal types on that path must be considered.

Accordingly, it would be desirable to provide a more optimal method of allocating power among the channels on the return path of a CATV network, in which the method is independent of deployed infrastructure or plant technology choices.

SUMMARY OF THE INVENTION

The present invention providing a method of allocating power among a plurality of signals located on different channels of the return path of a cable data network by dividing a total power available for the signals on the return path in accordance with a minimum value of an average BER for all the signals and allocating power to each of the signals in accordance therewith.

In one exemplary embodiment, a method of allocating signal power among a plurality of different channels on the return path of a cable data network, each of said channels employing one of a plurality of different signal formats, is proposed. Parameters specifying modulation type and symbol rate for each signal format employed on the return path, the parameters thereby providing a parameter of channel bandwidth, are obtained, as is the AWGN noise floor across the reverse link and a nominal maximum available RF power for transmitting signals on the reverse path. A predetermined BER expression is then obtained for each of the modulation types employed on the return path, each expression requiring a plurality of input values that includes the previously obtained parameters noted earlier. An expression for an average BER is then formulated based on the predetermined BER expressions obtained earlier and on a number of channels of each signal format type associated with a corresponding BER expression and the power to be allocated to each signal format by minimizing said average BER is calculated. Finally, the power is allocated to each of the plurality of channels associated with each signal format.

In alternative embodiments the BER expression may include various additional information, including FEC-using the BER approximations for coded systems, interference—using the BER approximations that account for C/I, clipping related effects, and non-flat noise floors.

In yet a further embodiment, the modulation type parameters are obtained by automatic means using DSP algorithms.

In still a further embodiment the results of the step of calculating the power to be allocated are downloaded from headend control software with an interface to the CMTS, or, may be delivered as observable information.

A Cable Modem Termination System (CMTS) may be implemented to direct a proper per-channel setting to achieve optimization of a minimum average BER based on the results of the step of calculating the power to be allocated.

Other aspects of the present invention will be apparent from a reading of the following in concert with the figures.

BRIEF DESCRIPTION OF THE DRAWINGS

The various features and advantages of the subject invention will be better understood by reference to the detailed description which follows taken in conjunction with the accompanying drawings, of which.

DETAILED DESCRIPTION OF THE INVENTION

Figure 1:
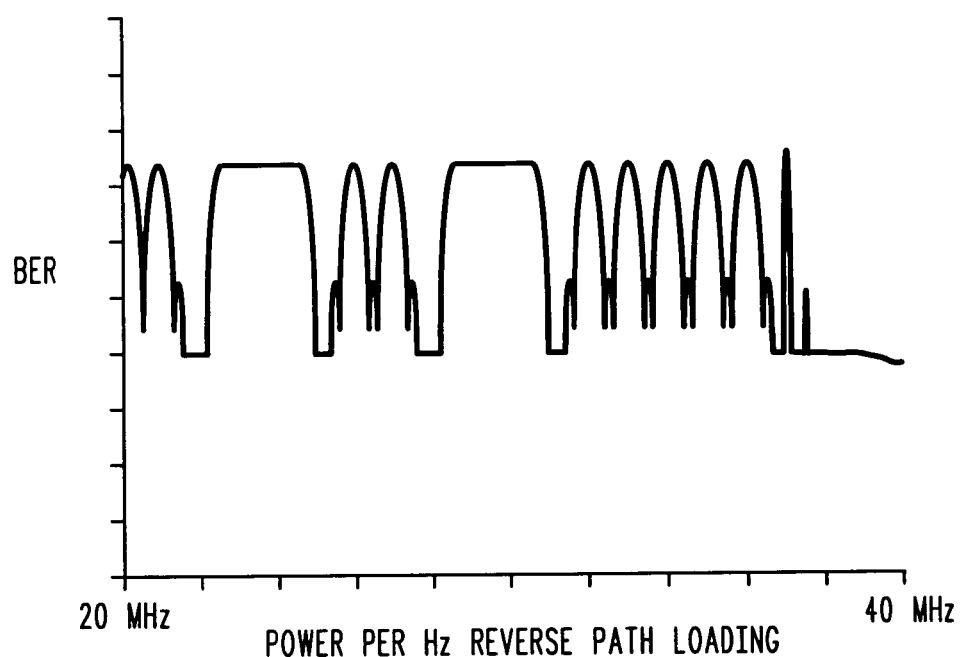
FIG. 1 illustrates a power-per-Hz channel line up.

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present inventor has recognized that a more optimal method of allocating power among the channels on the return path of a CATV network can be achieved by minimizing their average BER performance. The use of such a method becomes particularly valuable as the need for higher bandwidth efficiency and higher throughput are sought, all while achieving better performance in the quickly evolving world of CATV data traffic. Furthermore, implementation of the method does not necessarily require an investment in additional equipment, but rather can utilize existing infrastructure more efficiently.

At the outset, it should be noted that the present invention is applicable not only to the return path of a CATV network, but more generally to the return path of any cable data network. Such networks are often implemented as an all-coaxial or a hybrid-fiber/coax (HFC) cable network. Moreover, while the following section sets forth one particular technique by which the average BER may be minimized, those of ordinary skill in the art will recognize that the present invention encompasses any appropriate technique or techniques for determining and minimizing the BER of the channels traveling on the return path I. Optimization Methodology To determine an optimal power allocation based on minimum average BER, we can take advantage of the following "knowns" about the reverse path:

Known BER expressions of modulation schemes
Flat AWGN noise floor across (most of) band
Known power constraint associated with A/D or laser drive
Common range of target BER
Known mathematical tools for minimization/maximization Given the above set of information, and a goal of minimum BER, the analysis can proceed. For simplification, consider the case whereby each channel has the same target BER (the case where they do not have the same target BER can be numerically implemented because of the first bullet above). The goal is to minimize the average BER, which is expressed mathematically as:

$$BER(avg) = (N_1 BER_1 + N_2 BER_2 + N_3 BER_3 + \ldots N_k BER_k)/(N_1 + N_2 + N_3 + \ldots N_k), \quad (1),$$

where $BER_k$ represents the BER expression for signal type k, and $N_k$ represents the number of channels of this signal type. Minimizing this expression for a given number of channels is equivalent to minimizing the numerator only.

Most BER expressions take the same general form for digital modulations such as those used in the return path:

$$BER = A_k Q[(B_k E_b/N_o)^{1/2}], \quad (2),$$

where Q(x) is the well-known error function relationship associated with the integration over a Gaussian probability density function (PDF), $E_b$ is the energy per bits (i.e., the signal power times bit time) and the coefficients $A_k$ and $B_k$ vary by modulation. The terms inside the parenthesis can be easily converted from energy-per-bit and noise power density to SNR, with the value of the coefficient $B_k$ changing accordingly.

The next mathematical step is to take advantage of the Chernoff bound, another common, if less well-known, very good and simple approximation to the Q(x) function over the range of relevant x in Q(x). The relevant range limit is based upon the desire for a good BER, and thus a low value of Q(x). A version of the bound that can be used for this range is $$Q(x) \approx \tfrac{1}{2}\exp(-x^2/2). \quad (3)$$

Using this bound results in an expression of equation (1) that is simply a summation of exponential function of several variables—coefficients associated with the line-up and modulation type, and the signal and noise parameters. The variable at the discretion of the system designer for reverse plant alignment is the signal power, assuming that the AWGN floor of the reverse link has been characterized—a common requirement to understand in a cable return plant. Thus, we have now evolved the expression of the problem to the following:

$$\text{Minimize } BER(avg) = \text{Min}[N_1 BER_1(P_1) + N_2 BER_2(P_2) + N_3 BER_3(P_3) + \ldots N_k BER_k(P_k)], \quad (4)$$

where $P_k$ is the signal power of the $k^{th}$ signal type, and $BER_k$ $(P_k)$ implies the BER of that signal type as a function of the power allotted. Obviously, minimum BER is obtained by allowing all of the channels to maximize $P_k$. Just as obviously, this is not a practical solution, as there are constraints on the total power to be shared, generally driven by the clipping limitations associated with the RF drive to the return path A/D converter or laser within the fiber optic node. As previously mentioned, the desired nominal RF total drive level chosen, $P_T$, varies by architecture and philosophy, but it is a constant. This turns the problem into solving for:

$$\text{Min}[N_1 BER_1(P_1) + N_2 BER_2(P_2) + N_3 BER_3(P_3) + \ldots N_k BER_k(P_k)],$$

under the constraint that:

$$P_T = P_1 + P_2 + P_3 + \ldots P_k. \quad (5)$$

Equation (5) can also be written as can be written also as $$0 = P_1 + P_2 + P_3 + \ldots P_k - P_T \quad (6)$$

This problem is now expressed in the form of a generalized class of problems that can be solved using the Lagrange multiplier technique. Using w, x, y, z to represent the signal powers of four different types of services and associated signal types sharing the return spectrum, the power allocated to each becomes:

$$w := \left(\frac{-1}{a}\right) \cdot (K1 + K2 + K3 - \ln(a \cdot A)) \quad (7)$$

$$x := \left(\frac{-1}{b}\right)(K1 + K2 + K3 - \ln(b \cdot B))$$

$$y := \left(\frac{-1}{c}\right)(K1 + K2 + K3 - \ln(c \cdot C))$$

$$z := \left(\frac{-1}{d}\right)(K1 + K2 + K3 - \ln(d \cdot D)),$$

where A, B, C, and D are constant multiplier coefficients as previously described determined by the particular modulation used for channel w, x, y, z, and, for a specific set of modulations in the example to follow (QPSK, 16-QAM, 64-QAM, and QPSK again-modulation type dependent), $$a := \frac{Ta}{2 \cdot \text{No\_watts\_per\_Hz}} \quad (8)$$

$$b := \frac{Tb}{10 \text{ No\_watts\_per\_Hz}}$$

$$c := \frac{Tc}{42 \cdot \text{No\_watts\_per\_Hz}}$$

$$d := \frac{Td}{2 \cdot \text{No watts per Hz}}.$$

Also, for Na individual channels of type w, Nb of x, Nc of y, and Nd of z, the remaining terms above to complete the equation definition are:

$$K1 := \left[\frac{Na}{Na + \left(\frac{a \cdot Nb}{b}\right) + \left(\frac{a \cdot Nc}{c}\right) + \left(\frac{a \cdot Nd}{d}\right)}\right] \cdot \ln\!\left(a \cdot \frac{A}{2}\right) + \quad (9)$$

$$\left[\frac{Nb}{Nb + \left(\frac{b \cdot Na}{a}\right) + \left(\frac{b \cdot Nc}{c}\right) + \left(\frac{b \cdot Nd}{d}\right)}\right] \cdot \ln\!\left(b \cdot \frac{B}{2}\right)$$

$$K2 := \left[\frac{Nc}{Nc + \left(\frac{c \cdot Na}{a}\right) + \left(\frac{c \cdot Nb}{b}\right) + \left(\frac{c \cdot Nd}{d}\right)}\right] \cdot \ln\!\left(c \cdot \frac{C}{2}\right) +$$

$$\left[\frac{Nd}{Nd + \left(\frac{d \cdot Na}{a}\right) + \left(\frac{d \cdot Nb}{b}\right) + \left(\frac{d \cdot Nc}{c}\right)}\right] \cdot \ln\!\left(d \cdot \frac{D}{2}\right)$$

$$K3 := \ln(2) - \frac{Pt}{\left(\frac{Na}{a}\right) + \left(\frac{Nb}{b}\right) + \left(\frac{Nc}{c}\right) + \left(\frac{Nd}{d}\right)},$$

As complex as this may appear in terms of mathematical expressions, a basic mathematical package (Excel, MathCad, Matlab) can calculate these solutions once the expressions are plugged in. The analysis simply needs the inputs for the known parameters of modulation type and rate, number of channels for each, and noise performance of the link.

II. Implementation Methodology

Return path alignment optimization may be performed based on the criteria proposed above. Specifically, the analysis and calculations above indicate the necessary knowledge to provide the set of variables needed to develop a solution to the optimization problem. The variables required for optimization are listed below.

1) Modulation type and number of channels of each type
2) Bandwidth per channel (i.e., the modulation or "symbol" rate)
3) Total RF power available
4) Channel noise power or, equivalently, for a given received power, channel signal-to-noise ratio (SNR)

It should also be noted that one additional piece of information channel frequency, is useful for optimization, but is optional. Specifically, it provides a technically more complete optimization, but perhaps not as practical an end result. The channel frequency and SNR information can be used to implement optimization that includes the condition of a non-flat noise floor in the return band. The optimization method previously described assumes the noise floor is flat, based on some average SNR or regional SNR measurements. However, it is likely that the low-end of the return band, the 5-15 MHz region in particular, does not have a flat power spectral density. In practice, this spectral region is not typically used for high-speed data services anyway, because of its poor characteristics. As such, it does not factor into the calculations.

Furthermore, even if this region were employed for signaling, it is likely that an operator would not find it desirable to sacrifice excellent performance (low BER) in many other good channels elsewhere in the band to achieve a reduced BER on a few poor quality channels in a small region of the band, carrying less valuable services. This would be the raw result of the optimization based upon average BER, although a "weighted" average that applied some measure of cost to the importance of various levels of performance certainly could be implemented to mitigate this effect. For the remainder of this discussion, we will assume that the use of a flat noise floor approximation, governed by an average noise density determined from a subset of channels across the clean spectrum region of the band (>15 MHz). For completeness, we will carry the center frequency knowledge in the remainder of the discussion, since it has implication towards implementation should that feature be exercised.

Those skilled in the art will appreciate that the majority of the information required to implement the above described optimization technique may be obtained from the Data Over Cable Service Interface Specification (DOCSIS) Management Information Base (MIB). This specification describes the requirements for equipment and software for compliance with the CableLabs cable modem system standardization program. The DOCSIS system is the baseline around which virtually all cable modem service offerings have evolved into, if not deployed as DOCSIS standardized from the start. Within the DOCSIS framework are requirements and suggestions for ease of monitoring, maintenance, and fault detection, all designed to create a system that is easy to manage within the CATV infrastructure and service package. Among the elements key to this management package and referenced in DOCSIS requirements is a document generated out of the Internet Engineering Task Force (IETF). This document, Radio Frequency (RF) Interface Management Information Base for MCNS/DOCSIS Compliant RF Interfaces, RFC-2670, defines the basic set of managed objects for Simple Network Management Protocol (SNMP) based supervision.

The RFC-2670 document describes key metrics for observation to provide the necessary network supervision for smooth operation of a DOCSIS-based cable modem system. Among the managed objects associated with the Cable Modem Termination System (CMTS) is the following information, all of which can be obtained from the Management Information Base (MIB)—1) Modulation type; 2) Channel width (Bandwidth); 3) Channel power; 4) Channel signal quality (within which SNR is available); and 5) Channel frequency Clearly, the information available in the MIB is almost the complete set of information required to allow implementation of the optimization method proposed. The parameters that are not precisely what is required are easily obtained from the information, either manually or automatically, whichever approach suits the taste and support equipment of a cable headend operator.

Specifically, the only information not directly obtainable from the MIB is associated with the number of total channels allocated, which can be equivalently implemented in the equations noted as the amount of total bandwidth associated with any particular type of modulation. In either case, the type of modulation, and the channel width are both available, and, as such, the amount of bandwidth and power associated with each is very easily obtainable by observation by a human operator or from an interface that communicates with the CMTS.

With respect to actual implementation of the proposed optimization method, Headend (HE) management and control systems have traditionally been a standard part of cable HE equipment, and have increasingly been evolving to support control, management, and maintenance of the concurrently evolving application set. CMTS support represents a major infrastructure element that fall into this category. Headend configuration via manual setup and operation involves many activities that, by definition of the goals for the configuration, directly obtain parameters associated with signal power, allocated bandwidth, and SNR. Regardless of how the information is obtained, the calculations required for optimization are rudimentary mathematical operations that can be performed in software that has access to the information cited in the tables above. Whether the information is downloaded from an adjacent piece of Headend Control Software (HCS) with an interface to the CMTS, or manually entered in a Headend configuration procedure, the mathematical result can be calculated. As in the case of the information input, the output information can be delivered as observable information to support manual configuration, or, more elegantly, be fed back to a CMTS via an interface designed to provide a communication link, and direct the CMTS to the proper per-channel power setting necessary to achieve optimization (the details of the return path BER optimization equipment interfaces and signal flow are described below with reference to FIG. 3).

In addition, those skilled in the art will appreciate that a digital approach to the evolving return path infrastructure is complementary to the optimization routine proposed. An HFC return path architecture employing digital technology has been proposed in commonly-assigned U.S. Pat. No. 6,323,793, issued Nov. 27, 2001. The reasons for the development of this technology are many and varied, and one significant tangential benefit is the ability to perform processing on the data to enhance the link performance. One such process takes advantage of the fact the digital return technology in its most fundamental form is based upon broadband sampling. Viewed another way, it takes a snapshot of the spectrum at critically defined, periodic points in time, and replicates the spectral content at the receiver output before subsequent processing in an application receiver. Thus, the discrete samples that represent the digital return's data stream contain all of the spectral information that exists at the point of sampling, which is typically the RF spectrum at the input to a node or hub in the CATV plant. Spectrum information can be extracted by processing such as with an FFT or similar spectrum analysis algorithm.

The significance of recognizing the above for this discussion is that this digital approach to the evolving return infrastructure is nicely complementary to the optimization routine. Processing of the transport stream yields the important information about channel power, frequency, and bandwidth. Furthermore, the accuracy of that information and the speed at which it can be acquired can be traded off against one another to establish a particular rate of information gathering at a particular level of accuracy of the algorithm. Most importantly, these variables are extremely straightforward ones to obtain from the FFT function, and, furthermore, the FFT tool is a likely augmentation to digital return receiver (DRR) functionality for many other HE configuration reasons aside from its use in optimization. It is virtually always the case that spectral analysis is used for HE setup and maintenance, with the digital return providing a means to obtain this automatically and for other sophisticated purposes, rather than traditional manual methods that rely on test point availability and external supporting test equipment.

It is also important to recognize that the incorporation of an FFT function is not limited to DRR's. Such an operation can also be embedded into classical analog return path receivers (RPR's) by separately sampling and processing the samples all within the analog receiver. Again, the ability to observe spectral information in traditional receivers is via RF test points and external spectrum analyzers.

One other important piece of information for the method to proceed is the type of modulation. While this also can be input manually during setup and configuration steps, this is yet another process that can be automated via DSP algorithms. The subject of modulation identification is a complex one, deeply focused in pattern recognition and statistical analysis theory, which is out of the scope of this discussion. However, techniques do exist to observe a digital signal and perform processing on it to extract the knowledge about the type of digital modulation it employs. The effect of this capability on the optimization discussed herein is that manual entry or reliance on CMTS information for modulation information may not be necessary in the future. Evolving embodiments of digital return equipment may instead include the ability to make these modulation determinations, and thus rely less on the CMTS. This has the further advantage of not relying so heavily on a DOCSIS-compliant system for automation and ease of use.

The same principles apply with respect to how to use the digital return information for the optimization algorithm as was discussed for CMTS interfaces. Information passage from DRR's to and HCS system and calculations within the management system require only the ability to communicate these relevant parameters to the HCS. Once obtained, calculations can be performed, and the results communicated to a CMTS or other application HE equipment, informing these devices of the necessary level adjustments.

EXAMPLE

The following example illustrates implementation of optimized loading. Assume a minimum guaranteed performance DOCSIS return SNR of 25 dB at the end of the total link, which could be represented, for example, by a 12 dB analog FP link with 16-way Headend combining, or an 8-bit digital return link with 8-way combining.

Consider the following channel types in a line-up:

35×320 ksps (DOCSIS) QPSK (QPSK 1)

25×320 ksps (DOCSIS) 16-QAM

8×50 ksps other QPSK

4×500 ksps other 64-QAM

Table 1 shows the predicted BER's for the two loading scenarios based on this set of inputs.

TABLE 1

BER vs. Loading Methodology for SNR = 25 dB

| | Uniform Loading | | Optimized Loading | |
|---|---|---|---|---|
| | Power per Channel | BER | Power per Channel | BER |
| QPSK 1 | 11.7 dBmV | 0.00E + 00 | 5.5 dBmV | 0.00E + 00 |
| QPSK 2 | 3.6 dBmV | 0.00E + 00 | −2.4 dBmV | 0.00E + 00 |
| 16-QAM | 11.7 dBmV | 0.00E + 00 | 12.4 dBmV | 0.00E + 00 |
| 64-QAM | 13.6 dBmV | 7.70E − 07 | 20.4 dBmV | 0.00E + 00 |
| Avg BER | | 4.30E − 08 | | 0.00E + 00 |

If the SNR is dropped to 20 dB, the results of Table 2 are obtained.

TABLE 2

BER vs. Loading Methodology for SNR = 20 dB

| | Uniform Loading | | Optimized Loading | |
|---|---|---|---|---|
| | Power per Channel | BER | Power per Channel | BER |
| QPSK 1 | 11.7 dBmV | 0.00E + 00 | 6.0 dBmV | 2.10E − 10 |
| QPSK 2 | 3.6 dBmV | 0.00E + 00 | −1.7 dBmV | 3.20E − 11 |
| 16-QAM | 11.7 dBmV | 2.30E − 08 | 12.5 dBmV | 1.10E − 09 |
| 64-QAM | 13.6 dBmV | 2.40E − 03 | 20.1 dBmV | 7.70E − 09 |
| Avg BER | | 1.30E − 04 | | 9.20E − 06 |

Clearly, in both cases, better BER performance is obtained when the loading accounts for the modulation type. What the technique does is offer the excess power allocated to robust modulations, such as QPSK in this example, to the less robust modulations that need the extra TLC. The resulting average BER is minimized overall, although, note that on an individual channel basis for SNR=20 dB, the QPSK channels do begin to count errors where in the uniformly loaded case they did not. Again, this emphasizes that the optimization is over all channels, but perhaps at the expense of some of them degrading if others channels more than overcome that degradation with their individual gains.

Figure 2:
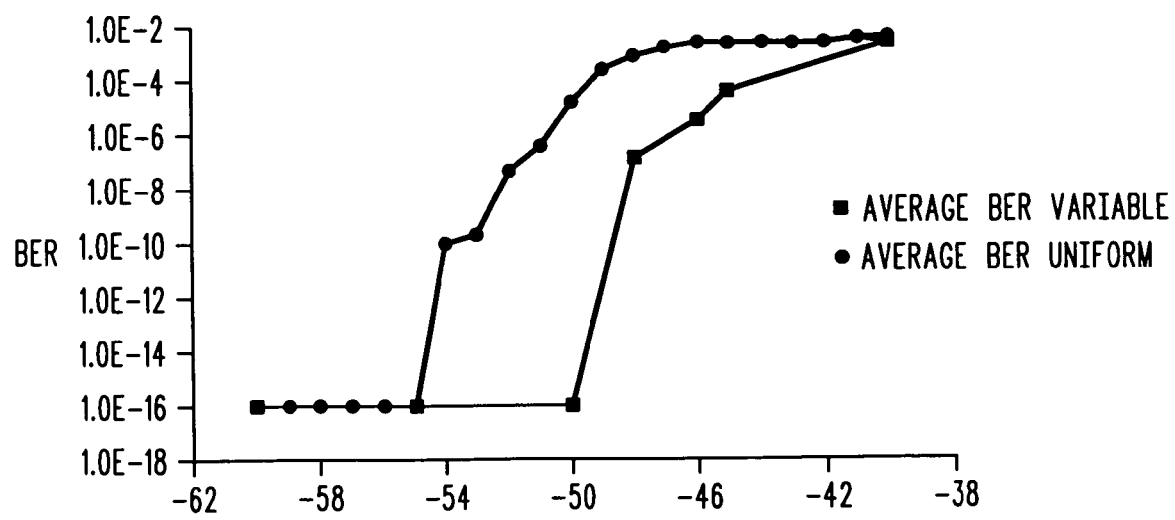
FIG. 2 plots the average BER for optimal (variable) loading and uniform (measured) loading.

FIG. 2 plots the average BER for optimal and uniform loading (measured). Here, "AVG BER VAR" refers to the optimal (variable) loading case, as compared to the uniform, or power-per-Hz approach.

Of course, those skilled in the art will appreciate that the techniques used to generate the results in the example may be extended to cases of further practical interest, many of which can be handled with minor modifications to the analysis. In principle, the Lagrange analysis approach is a generalized solution—it only needs a set of equations to start out with to solve. In the example, the equation that was solved was minimum BER for an all-flat, all AWGN, impairment only. However, the BER expressions when various other impairments, or other system variations are included can also be captured with this approach and the approach is not intended to be limited in any way to the exemplary "all AWGN impairment". Examples include, but are not limited to, Inclusion of FEC, using the BER expressions for coded systems Inclusion of interference, using BER expressions that account for C/I Inclusion of clipping-related effects with BER expressions that account for this probability Inclusion of non-flat noise floors However, depending on the situation of interest, the BER expressions' modification may lead to more difficulty in getting to a clean closed-form solution, although numerical solutions are always readily obtainable using common computing platform capabilities available today.

An example of the latter situation (non-flat noise floor), based on the prior case channel line-up, was examined analytically. The case observed was one in which it was assumed that a DOCSIS channel was running 16-QAM signals, and was placed in the low end of the spectrum. The noise density in that end of the spectrum was assumed to be 10 dB higher than for the rest of the channels, which were placed in the clean part of the spectrum. The results for a return path with "SNR=25 dB" (not including the noisy end) are shown in Table 2. Again, the superiority in terms of performance for the optimized loading approach is evident.

TABLE 3

BER vs. Loading Methodology for SNR = 25 dB, Low End Noise Floor Increase

|  | Uniform Loading | | Optimized Loading | |
| --- | --- | --- | --- | --- |
|  | Power per Channel | BER | Power per Channel | BER |
| QPSK 1 | 11.7 dBmV | 0.00E + 00 | 0 dBmV | 2.00E − 08 |
| QPSK 2 | 3.6 dBmV | 0.00E + 00 | 15 dBmV | 2.90E − 09 |
| 16-QAM | 11.7 dBmV | 8.80E − 04 | 14 dBmV | 1.10E − 06 |
| 64-QAM | 13.6 dBmV | 7.80E − 07 | −8 dBmV | 7.40E − 07 |
| Avg BER |  | 3.10E − 04 |  | 4.50E − 07 |

It has been shown that a more optimal way of loading the return path, in terms of minimum average BER performance, is available. The use of such a tool becomes valuable as the need for higher bandwidth efficiency and higher throughput are sought, all while achieving better performance in the quickly evolving world of CATV data traffic. Being governed by a per-Hz methodology is a sensible way to begin activation of the return, but with return spectrum filling, and reverse path service maps being implemented and stabilized, the opportunity to maximize the investment in return path performance is possible with this new approach. Furthermore, it requires no equipment investment, and merely utilizes existing infrastructure more efficiently.

More specifically, the method proposed provides a means to optimize the return path for lowest average BER. Several approaches for implementation exist. Manual entry during configuration of the Headend is one obvious approach, which takes advantage of the fact that a need to address level alignment already exists, just with a different set of guidelines to follow. More sophisticated implementations have multiple advantageous attributes in the area of network automation and simplification, as well as for adaptive, real-time performance optimization. Examples include the use of freely available digital return spectral information, or the use of existing spectral processing techniques in traditional analog receivers. Additionally, information gathered by CMTS devices, and other similarly sophisticated service receivers, can be directly used as inputs to solve the optimization problem. In order to incorporate the optimization in the most effective way, this obtained data will be communicated to an HCS management system, where calculations can be performed centrally, and the associated level alignment information can be communicated back to the specific application receivers and processors that run the associated return path systems. At some point in the evolution of Headends, this process will be simplified to a single management and interface package and protocol, such that multiple service platforms are easily accommodated through use of compatible interfaces. Efficient communication among platforms and control systems will simplify HE configuration overall in this case. This includes the ability to easily intermingle different services and have the associated equipment able to recognize settings amongst one another and communicate accordingly. In this fashion, among other mutual benefits, alignment optimization of the complete set is done most elegantly.

Figure 3:
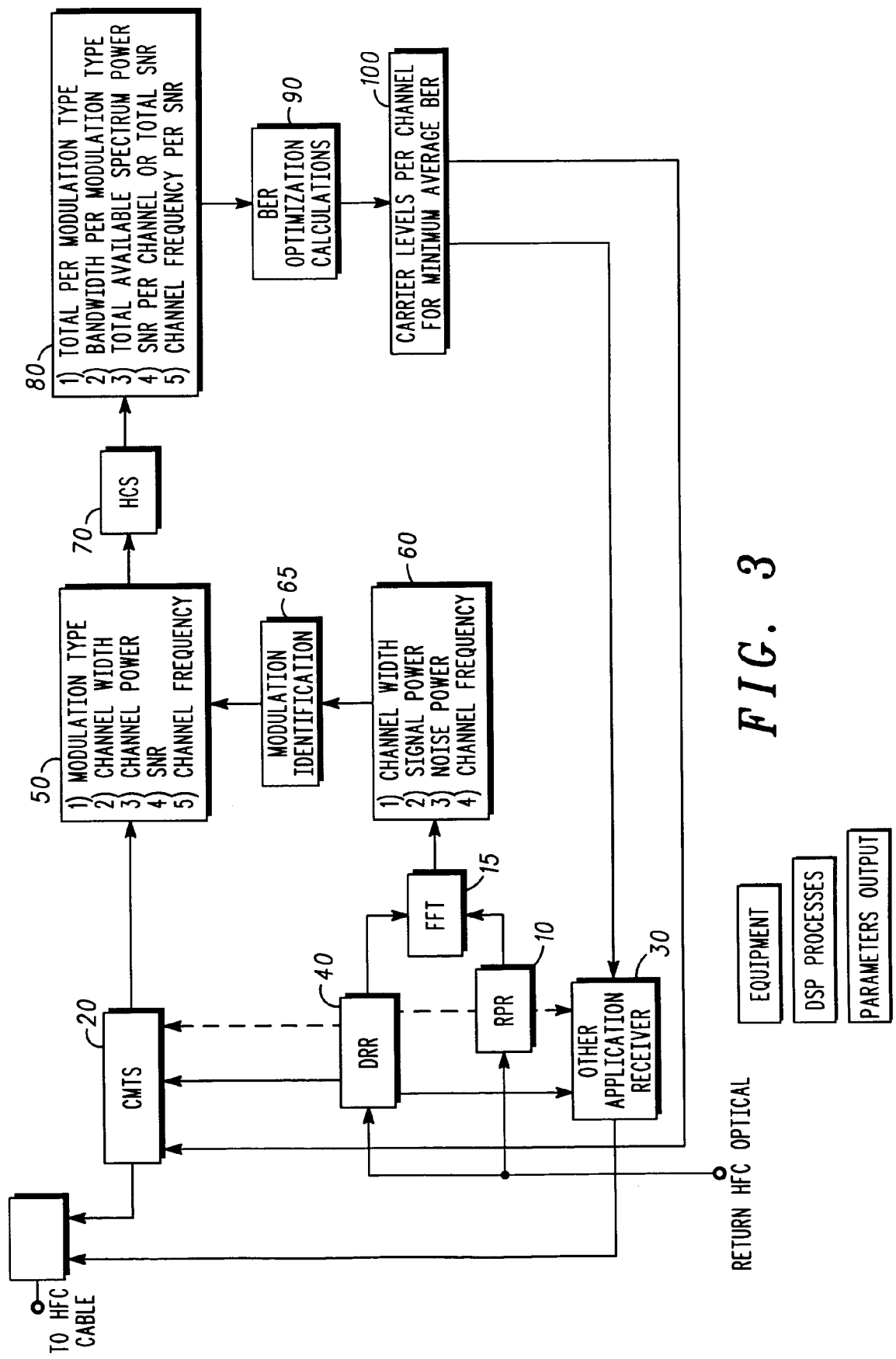
FIG. 3 illustrates the return path BER optimization equipment interfaces and signal flow diagram in accordance with an illustrative embodiment of the present invention.

Specifically, FIG. 3 illustrates the informational flow and equipment involved to accomplish the goal of closed-loop optimization through HE device communications and interfaces. The port labeled "return HFC optical input" represents the 5-42 MHz (North America) return path signal in the optical domain arriving at the Headend, and contains modem traffic that originated in cable modem consumer households. The signal may arrive as an analog or liner optical signal, in which case it terminates into a traditional return path receiver (RPR 10), which outputs an RF spectrum that is subsequently split to application specific receivers 30, including a CMTS 20. The return path optical signal may also be in baseband digital format, in which case it terminates into a digital return receiver (DRR 40). The outputs of the DRR and RPR are ultimately the same—the reverse path 5-42 MHz spectrum in the electrical domain (an RF band).

Concentrating on the DOCSIS application, the spectrum is delivered to the CMTS 20 for demodulation of the various return path signals. The CMTS 20, by design, also provides information about the configuration and channel parameters of each signal. As described in detail above, much of this information is key to implementing the optimization. The information of interest is listed as block 50 exiting CMTS 20: modulation type, channel width (symbol rate), channel power, SNR and channel frequency. In addition, the RPR or DRR can deliver the spectrum to a processing element 15 that performs a Fast Fourier Transform (FFT) function (which may also be part of either the RPR itself or the DRR). The FFT 15 and subsequent post-processing can be designed to provide information similar to the CMTS' 20 information (see block 60, providing information on the channel width (symbol rate), signal power, noise power and channel frequency). In addition, future features such as identifying the modulation (shown as block 65), rather than requiring this information to be known ahead of time, are possible. At this time, this is not an enabled feature, but the ability to derive the necessary information in multiple ways, does exist, and thus is intended to be illustrated as block 65.

The five parameters noted above in block 50 are then delivered to the Headend Control Software (HCS) block 70 which uses these inputs, combines them with known plant settings and configuration parameters of the CMTS 20, and performs some processing to format the data to make available directly the necessary optimization variables, per the optimization equations (see block 80). The calculations themselves (block 90) are straightforward, closed-form mathematical equations that result in a set of optimized carrier levels (block 100).

The optimized carrier levels of block 100 are then fedback to the CMTS 20 as indications of the levels at which the modems are to be directed. The CMTS 20, by design, maintains constant communication with the modems in the field updating and monitoring the power levels of each. Thus the ability to perform the adjustment of modem power levels by a CMTS is built into DOCSIS. The optimization process simply tells it a different set of power levels that the "default" power-per-Hz, manually implemented, method would indicate. Since the information at the CMTS is available continually, automatic adjustment and optimization can take place dynamically if so desired.

Although various embodiments are specifically illustrated and described herein, it will be appreciated that modifications and variations of the invention are covered by the above teachings and within the purview of the appended claims without departing from the spirit and intended scope of the invention. For example, multiple legacy applications currently exist without sophisticated interfaces, digital processors, or features otherwise amenable to optimization via automation. However, HE management systems, integration processes, and application receivers will have to incorporate new such features in order to properly address the aggressive new deployment of high speed data services like DOCSIS and the goal of improved network management capability. This is the case whether an optimization method is applied or not. Thus, it has become a key objective of HCS designers and HE operators to create a coordinated approach to management of the various HE devices, whether equipped with newer, sophisticated, interfaces, or without. Addressing this problem essentially addresses the same set of criteria necessary to support implementing these devices as part of the optimization method in accordance with the teachings herein. Furthermore, this example should not be interpreted to limit the modifications and variations of the invention covered by the claims but are merely illustrative of possible variations.

What is claimed is:

1. A method of allocating signal power among a plurality of different channels on the return path of a cable data network, each of said channels employing one of a plurality of different signal formats, the method comprising the steps of:
   a) obtaining parameters specifying modulation type and symbol rate for each signal format employed on the return path, wherein said parameters thereby provide a parameter of channel bandwidth;
   b) obtaining the AWGN noise floor across the reverse link;
   c) choosing a nominal maximum available RF power for transmitting signals on the reverse path;
   d) obtaining a predetermined BER expression for each of the modulation types employed on the return path, each of said predetermined BER expressions requiring a plurality of input values that includes said at least one parameter obtained in step a) for the signal format associated therewith, the AWGN noise floor across the reverse link obtained in step b), and a maximum available RF power for transmitting signals on the return path obtained in step c);
   e) formulating an expression for an average BER based on the predetermined BER expressions obtained in step d) and on a number of channels of each signal format type associated with a corresponding BER expression obtained in said obtaining step d);
   e) calculating the power to be allocated to each signal format by minimizing said average BER; and
   f) allocating power to each of the plurality of channels associated with each signal format in accordance with the power calculated in step e).

2. The method of claim 1, wherein the BER expression includes FEC, using the BER approximations for coded systems.

3. The method of claim 1, wherein the BER expression includes interference, using the BER approximations that account for C/I.

4. The method of claim 1 wherein the BER expression includes clipping related effects.

5. The method of claim 1, wherein the BER includes non-flat noise floors.

6. The method of claim 1, wherein the modulation type parameters obtained in step a) are obtained by automatic means using DSP algorithms.

7. The method of claim 1, wherein the results of step (d) are downloaded from headend control software with an interface to the CMTS.

8. The method of claim 7, wherein a Cable Modem Termination System (CMTS) directs a proper per-channel power setting to achieve optimization of a minimum average BER based on the results of step (d).

9. The method of claim 1, wherein the results of step (d) are delivered as observable information.

10. The method of claim 9, wherein a Cable Modem Termination System (CMTS) directs a proper per-channel power setting to achieve optimization of a minimum average BER based on the results of step (d).

11. The method of claim 1, further comprising the step of (g) continually automatically adjusting the power allocated, so as to maintain optimization, based on constant communication with modems in the field.

12. The method of claim 1 wherein the parameter employed in step (d) is derived from information obtained in step (a).

13. The method of claim 1 wherein the AWGN is calculated using the signal parameters of channel power and channel signal quality.

14. The method of claim 1 further comprising the step of (g) identifying a part of the AWGN density and using that information to optimally allocate signal power in step (f).

15. The method of claim 1 wherein step (e) includes the step of obtaining the number of channels of each signal format type associated with each of the predetermined BERs.

16. The method of claim 1 wherein step (f) includes the step of allocating an equal amount of power to each channel that employs a common signal format.

17. The method of claim 1 wherein said plurality of input values includes an AWGN noise floor across the reverse link thereby providing a signal-to-noise ratio.

18. The method of claim 17 wherein the total available power is a nominal maximum RF total drive level based on plant infrastructure limitations.

19. The method of claim 1 wherein said cable data network is an HFC network.

20. A method of allocating power among a plurality of signals transmitted on different channels of the return path of a cable data network, said method comprising the steps of:
   a) dividing a total power available for the signals on the return path in accordance with a minimum value of an average BER for all the signals; and
   b) allocating power to each of the signals in accordance with step (a), wherein at least two of said signals employ different signal formats.

* * * * *